US012691789B2

(12) United States Patent
Yamaguchi et al.

(10) Patent No.: US 12,691,789 B2
(45) Date of Patent: Jul. 28, 2026

(54) VEHICULAR POWER CONTROL SYSTEM

(71) Applicant: YAZAKI CORPORATION, Tokyo (JP)

(72) Inventors: Hayato Yamaguchi, Makinohara (JP); Sadaharu Okuda, Makinohara (JP); Ryoichi Murata, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/900,617

(22) Filed: Sep. 27, 2024

(65) Prior Publication Data

US 2025/0018832 A1     Jan. 16, 2025

Related U.S. Application Data

(63) Continuation of application No. PCT/JP2023/035032, filed on Sep. 26, 2023.

(30) Foreign Application Priority Data

Sep. 27, 2022     (JP) ................................. 2022-154023

(51) Int. Cl.
    *B60L 58/20*     (2019.01)
    *B60L 1/00*      (2006.01)
    *B60L 3/00*      (2019.01)
(52) U.S. Cl.
    CPC ............. *B60L 58/20* (2019.02); *B60L 3/0084* (2013.01)

(58) Field of Classification Search
    CPC ............................... B60L 58/20; B60L 3/0084
    USPC ........................................................... 307/9.1
    See application file for complete search history.

(56) References Cited

U.S. PATENT DOCUMENTS

| | | | |
|---|---|---|---|
| 2020/0180462 A1* | 6/2020 | Ando | B60L 53/60 |
| 2023/0266962 A1* | 8/2023 | Katsumata | B60R 16/03 |
| | | | 717/168 |
| 2025/0210291 A1* | 6/2025 | Maezawa | B60L 3/0046 |

FOREIGN PATENT DOCUMENTS

| | | |
|---|---|---|
| JP | 2007-278216 A | 10/2007 |
| JP | 2012-152003 A | 8/2012 |
| JP | 2018-38116 A | 3/2018 |
| JP | 2017-163736 A | 12/2020 |

* cited by examiner

*Primary Examiner* — Rexford N Barnie
*Assistant Examiner* — Swarna N Chowdhuri
(74) *Attorney, Agent, or Firm* — KENEALY VAIDYA LLP

(57)     ABSTRACT

When a low voltage battery is exhausted, power necessary for starting up is supplied from a simple power supply connected to an ACC socket to a vehicle side. The power of the simple power supply is supplied to power supply terminals of a DC/DC converter and other loads, and is used to activate the DC/DC converter. After the DC/DC converter is activated, power on a high voltage battery side is stepped down and supplied to a low voltage battery side, and a power supply path for the DC/DC converter and the other loads is switched. A mode switch or a relay is used to switch between a normal mode and an emergency start mode.

4 Claims, 6 Drawing Sheets

VEHICULAR POWER CONTROL SYSTEM

CROSS-REFERENCE TO RELATED APPLICATIONS

The present application is a continuation application of PCT/JP2023/035032 that claims priority to Japanese Patent Application No. 2022-154023 filed on Sep. 27, 2022, the entire content of which is incorporated herein by reference.

TECHNICAL FIELD

The present disclosure relates to a vehicular power control system.

BACKGROUND ART

For example, when a vehicle is not used for a long period or when an on-board device such as a light or a heater is continuously used for a long time while an engine of the vehicle is stopped, electric energy stored in an on-board battery is discharged due to an influence of a dark current, a load current, or the like, and thus the battery is exhausted. The on-board battery is more likely to be exhausted when deteriorating. The on-board battery has a fairly low output voltage when exhausted, and thus normal operation of the vehicle such as starting the engine cannot be performed directly.

When exhausted, for example, the on-board battery in the vehicle is replaced with a new battery. Alternatively, a rescue vehicle or a large power supply device is prepared and connected to a power supply circuit of the target vehicle via a prescribed booster cable, so that the engine of the target vehicle is started by a technique called jump start.

On the other hand, for example, JP2018-038116A discloses a technique of a jump starter that can start an engine by storing power drawn out from a battery having a low remaining voltage value and discharging the power in a short time.

However, the battery of the vehicle may be exhausted in a place where it is difficult to prepare a rescue vehicle or a large power supply device, such as a mountainous region. Accordingly, even when the engine is started by the jump start technique, a user of the vehicle cannot operate himself or herself and has to request a load service or the like for a rescue operation. It thus takes time and effort to start the engine of the vehicle having an exhausted battery.

On the other hand, an electric vehicle (xEV) such as a pure electric automobile or a plug-in hybrid vehicle may be equipped with both a high voltage battery for driving and a low voltage battery. Power output from the low voltage battery is necessary as, for example, a power supply of various electronic control units (ECUs) and a power supply of various auxiliary devices (electrical components such as lamps, heaters, and electric motors).

The electric vehicle may be equipped with a DC/DC converter to enable a part of power stored in the high voltage battery to be supplied to a circuit on a low voltage battery side. That is, the high voltage power stored in the high voltage battery can be converted into a low voltage by the DC/DC converter and supplied to the circuit on the low voltage battery side.

However, in an electric vehicle equipped with both a high voltage battery and a low voltage battery, operation of the vehicle such as starting an engine is not possible when a battery on the low voltage battery side is exhausted. In this case, a circuit of the DC/DC converter will not be activated even when the high voltage battery stores sufficiently large power, and thus power on a high voltage battery side cannot be supplied to the low voltage battery side. Accordingly, the jump start technique needs to be used to start a vehicle having an exhausted battery, which takes time and effort.

SUMMARY OF INVENTION

The present disclosure provides a vehicular power control system that can facilitate starting of a vehicle when a low voltage battery in the vehicle is exhausted.

To achieve the above object, the vehicular power control system according to the present disclosure has following features.

A vehicular power control system includes:
 a high voltage battery mounted on a vehicle;
 a voltage conversion unit configured to convert a high voltage output from the high voltage battery into a low voltage;
 a control unit configured to control activation of the voltage conversion unit;
 a low voltage battery configured to supply a prescribed operation voltage to the voltage conversion unit and the control unit; and
 an external power supply connector configured to connect a prescribed external power supply, in which
 the control unit has a function of at least temporarily supplying external power to the voltage conversion unit and the control unit as the operation voltage instead of the low voltage battery, the external power being supplied from the external power supply via the external power supply connector.

According to the vehicular power control system of the present disclosure, when the low voltage battery is exhausted, the control unit can replace the low voltage battery and supply, as the operation voltage, the external power supplied from the external power supply via the external power supply connector to the voltage conversion unit and the control unit. Accordingly, even if the battery is exhausted, the voltage conversion unit can be operated with the external power, a high voltage output from the high voltage battery can be converted into a low voltage by the voltage conversion unit and supplied to the power supply circuit on a low voltage battery side. For this reason, the engine can start up without using a jump start technique. In addition, power necessary for activating the voltage conversion unit is relatively small, and thus a relatively small battery or the like can be used as the external power supply.

The present disclosure is briefly described above. Details of the present disclosure can be further clarified by reading modes (hereinafter, referred to as "embodiments") for carrying out the disclosure to be described below with reference to the accompanying drawings.

BRIEF DESCRIPTION OF DRAWINGS

FIG. 2 is an electric circuit diagram showing a power control system according to Modification-1;

FIG. 3 is an electric circuit diagram showing a power control system according to Modification-2;

DESCRIPTION OF EMBODIMENTS

A specific embodiment of the present disclosure will be described below with reference to the drawings.

Figure 1:
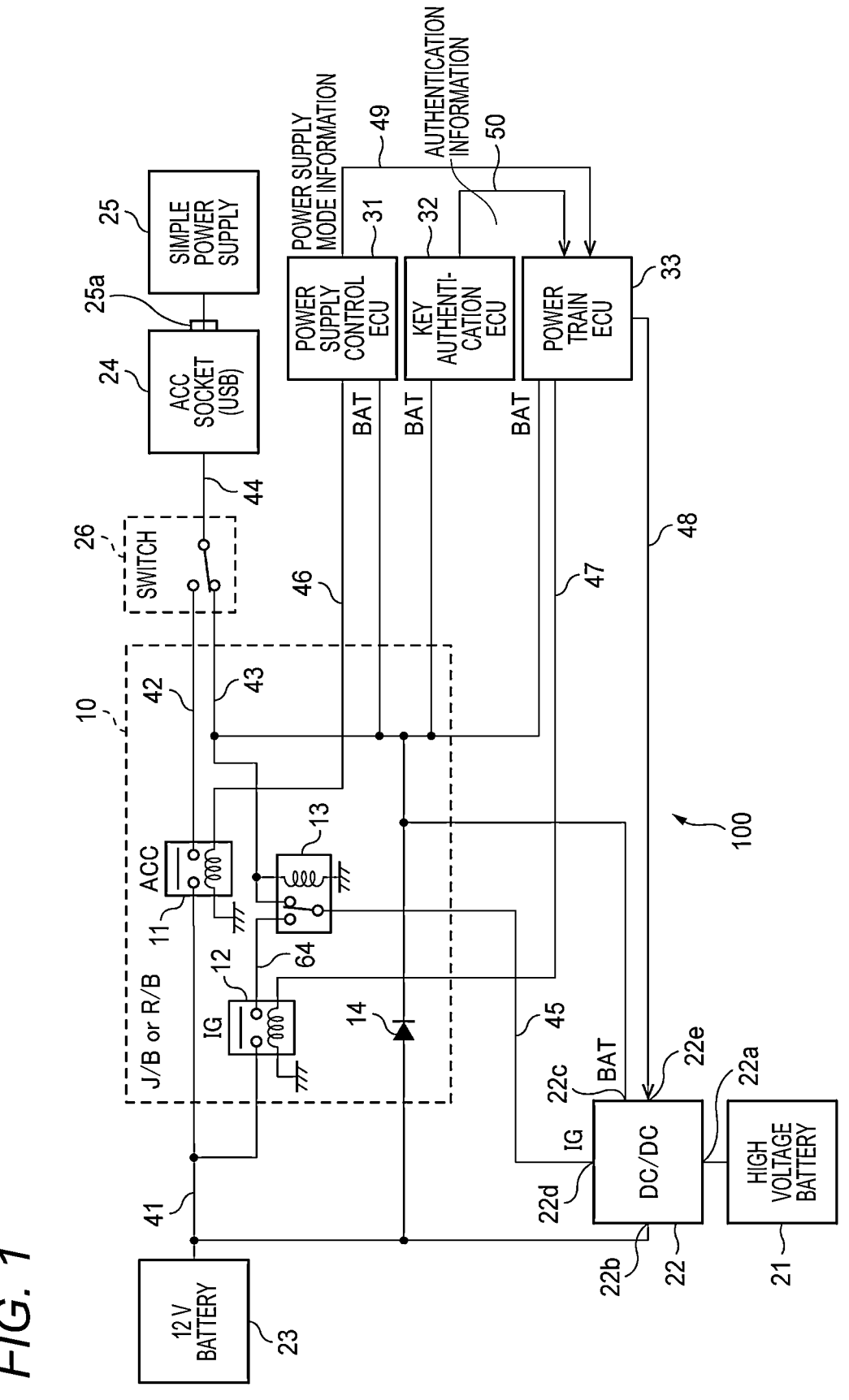
FIG. 1 is an electric circuit diagram showing main configurations of a power control system according to an embodiment of the present disclosure.

FIG. 1 is an electric circuit diagram showing main configurations of a power control system 100 according to the embodiment of the present disclosure.

The power control system 100 shown in FIG. 1 is assumed to be used in a state of being mounted on an electric vehicle such as a pure electric automobile or a plug-in hybrid vehicle. The electric vehicle equipped with the power control system 100 shown in FIG. 1 is assumed to include a high voltage battery 21, a low voltage battery 23, and a DC/DC converter 22 shown in FIG. 1 as on-board power supply devices.

The high voltage battery 21 can store a large amount of power necessary for the vehicle to travel, and can supply power necessary for a load such as an electric motor for traveling. The high voltage battery 21 stores high voltage power of, for example, about hundreds of volts [V]. By handling the high voltage, power loss generated in a power distribution path, a load, and the like of a traveling system can be reduced.

The low voltage battery 23 stores low voltage power of, for example, about +12 [V], and can supply power necessary for various loads of a low voltage system. Loads such as various electronic control units (ECUs), lamps, heaters, and low voltage electric motors operate at a low voltage, and thus power loss can be reduced by supplying power of an appropriate voltage from an output of the low voltage battery 23.

The direct current (DC)/DC converter 22 steps down high voltage DC power on a high voltage battery 21 side to generate low voltage DC power that can be used on a low voltage battery 23 side. The DC/DC converter 22 performs switching in synchronization with, for example, a prescribed pulse signal therein. By appropriately adjusting a duty or the like of the pulse signal, power conversion from a high voltage to a desired low voltage can be performed with high efficiency.

However, to operate the DC/DC converter 22, power supply from outside is indispensable. For example, when the DC/DC converter 22 operates by power supplied from the low voltage battery 23, there is a high probability that the DC/DC converter 22 will not be activated when the low voltage battery 23 is exhausted, unless otherwise specified.

The DC/DC converter 22 shown in FIG. 1 includes a high voltage side input terminal 22*a*, a low voltage side output terminal 22*b*, a battery (BAT) line connection terminal 22*c*, an ignition (IG) line connection terminal 22*d*, and a control input terminal 22*e*.

The high voltage side input terminal 22*a* of the DC/DC converter 22 is connected to an output of the high voltage battery 21, the low voltage side output terminal 22*b* is connected to a battery power supply line 41, and the battery power supply line 41 is connected to the low voltage battery 23. The BAT line connection terminal 22*c* is connected to a load side power supply line 43, the IG line connection terminal 22*d* is connected to an IG output power supply line 45, and the control input terminal 22*e* is connected to a control line 48.

The power control system 100 includes, in addition to the high voltage battery 21, the DC/DC converter 22, and the low voltage battery 23, main components including an electric junction box 10, an ACC socket 24, a simple power supply 25, a mode switch 26, a power supply control ECU 31, a key authentication ECU 32, and a power train ECU 33.

The electric junction box 10 is a component corresponding to a junction block (J/B) or a relay box (R/B) mounted on a general vehicle. The electric junction box 10 according to the present embodiment also includes specific components, which will be described later.

The accessory (ACC) socket 24 is a standard socket prepared to enable power supply connection of various accessory devices prepared by a user, and is formed into, for example, a connector shape compatible with a universal serial bus (USB) standard. The user of the vehicle can connect various accessory devices compatible with the USB standard to the ACC socket 24.

For example, power on the low voltage battery 23 side can be supplied to a desired accessory device connected to the ACC socket 24. Power on an accessory device side connected to the ACC socket 24 can also be supplied to a load on a vehicle side.

The power control system 100 according to the present embodiment can connect the simple power supply 25 prepared by the user in advance to the ACC socket 24. The simple power supply 25 is a device temporarily used by the user as a supply source of power necessary to start the vehicle when the low voltage battery 23 is exhausted, and can supply, for example, power of 12 [V]. A specific example of the simple power supply 25 will be described later.

The mode switch 26 is a special manual operation switch disposed in a place (for example, below an instrument panel) where a driver of the vehicle can operate, and can select either an emergency start mode or a normal mode. When the low voltage battery 23 is exhausted, the user selects the emergency start mode with the mode switch 26, so that the vehicle can start up using the power from the simple power supply 25.

The power supply control ECU 31 has a function of instructing power supply to each circuit of an ACC system and an IG system. The key authentication ECU 32 has a function of authenticating a key necessary for driving the vehicle. The power train ECU 33 has a function of controlling the DC/DC converter 22.

The electric junction box 10 shown in FIG. 1 includes an ACC relay 11, an IG relay 12, a path switching relay 13, and a backflow prevention element 14.

The ACC relay 11 includes an electric coil for contact driving and one electric contact. One terminal of the electric contact of the ACC relay 11 is connected to the battery power supply line 41, and the other terminal thereof is connected to an ACC power supply line 42. The ACC power supply line 42 is connected to one terminal of the mode switch 26 via a prescribed wire harness.

One terminal of the electric coil of the ACC relay 11 is connected to an ACC control line 46, and the other terminal thereof is connected to the ground. The ACC control line 46 is connected to an output of the power supply control ECU 31. The electric contact of the ACC relay 11 can switch opening and closing of the connection of the battery power supply line 41 and the ACC power supply line 42 in accordance with a signal of the ACC control line 46. This opening and closing control is performed by the power supply control ECU 31.

The IG relay 12 includes an electric coil for contact driving and one electric contact. One terminal of the electric contact of the IG relay 12 is connected to the battery power supply line 41, and the other terminal thereof is connected to an IG input power supply line 64.

One terminal of the electric coil of the IG relay 12 is connected to an IG control line 47, and the other terminal thereof is connected to the ground. The IG control line 47 is connected to an output of the power train ECU 33. The electric contact of the IG relay 12 can switch opening and closing of the connection of the battery power supply line 41 and the IG input power supply line 64 in accordance with a signal of the IG control line 47. This opening and closing control is performed by the power train ECU 33.

The path switching relay 13 includes a switch including an electric coil for contact driving and two electric contacts that can be selectively connected. One terminal of the electric coil of the path switching relay 13 is connected to the load side power supply line 43, and the other terminal thereof is connected to the ground (earth).

The switch of the path switching relay 13 can selectively connect a terminal connected to the IG output power supply line 45 to a contact of one of the IG input power supply line 64 and the load side power supply line 43. Since the electric coil of the path switching relay 13 is connected to the load side power supply line 43, a selection state of the switch of the path switching relay 13 is automatically switched according to whether a voltage is applied to the load side power supply line 43.

That is, when a prescribed voltage is applied to the load side power supply line 43, the switch of the path switching relay 13 connects the load side power supply line 43 and the IG output power supply line 45. When a prescribed voltage is not applied to the load side power supply line 43, the switch of the path switching relay 13 connects the IG input power supply line 64 and the IG output power supply line 45.

The backflow prevention element 14 is formed as a diode, and allows a current to pass in a direction from the battery power supply line 41 toward the load side power supply line 43, and prevents reverse current passage. That is, only when a voltage of the battery power supply line 41 is higher than that of the load side power supply line 43, a current flows from the battery power supply line 41 to the load side power supply line 43.

In the configuration shown in FIG. 1, the BAT line connection terminal 22c of the DC/DC converter 22 and power supply terminals (BAT) of the power supply control ECU 31, the key authentication ECU 32 and the power train ECU 33 are connected to the load side power supply line 43. One terminal of the mode switch 26 is connected to the load side power supply line 43 via a prescribed wire harness.

The control line 48 connects a control output of the power train ECU 33 and the control input terminal 22e of the DC/DC converter 22. Accordingly, the power train ECU 33 can control the DC/DC converter 22.

A signal line 49 connects an output of the power supply control ECU 31 and an input of the power train ECU 33. The signal line 49 can input power supply mode information received from the power supply control ECU 31 to the power train ECU 33. A signal line 50 connects an output of the key authentication ECU 32 and an input of the power train ECU 33. The signal line 50 can input authentication information received from the key authentication ECU 32 to the power train ECU 33.

<Operation of System>

Operation of the power control system 100 shown in FIG. 1 will be described below.

In a normal state, when the engine or the like of the vehicle is started, the ACC relay 11 connects the battery power supply line 41 and the ACC power supply line 42, the IG relay 12 connects the battery power supply line 41 and the IG input power supply line 64, and the path switching relay 13 connects the IG input power supply line 64 and the IG output power supply line 45. The low voltage power output from the low voltage battery 23 is supplied to the power supply control ECU 31, the key authentication ECU 32, the power train ECU 33, and the DC/DC converter 22.

Accordingly, the vehicle can be normally started using the power stored in the low voltage battery 23. When the power train ECU 33 activates the DC/DC converter 22, the high voltage power output from the high voltage battery 21 can be converted into a low voltage inside the DC/DC converter 22 and supplied from the low voltage side output terminal 22b to the battery power supply line 41.

On the other hand, for example, when the vehicle which is left in a parking state for a long period is started or when an on-board device is continuously used for a long time while the engine is stopped, the low voltage battery 23 may be exhausted. In this case, the output voltage of the low voltage battery 23 abnormally decreases, and thus there is a high probability that one of the power supply control ECU 31, the key authentication ECU 32, and the power train ECU 33 does not operate normally. Further, a voltage applied to the BAT line connection terminal 22c and the IG line connection terminal 22d of the DC/DC converter 22 decreases, and thus the DC/DC converter 22 will not be activated.

Accordingly, even when sufficient power is stored on the high voltage battery 21 side, the power cannot be stepped down and used on a battery power supply line 41 side. For this reason, in a case of a general vehicle that does not include the power control system 100 having the special function of the present disclosure, it is necessary to perform jump start or the like that takes time to start the engine or the like.

On the other hand, in a case of the vehicle equipped with the power control system 100 shown in FIG. 1, the engine or the like can be easily started when the low voltage battery 23 is exhausted. That is, the user of the vehicle having an exhausted battery switches the mode switch 26 from the normal mode to the emergency start mode (state shown in FIG. 1) after the simple power supply 25 is prepared and a connector 25a is connected to the ACC socket 24 of the vehicle. Accordingly, the engine or the like can be started as described below.

In this case, as shown in FIG. 1, the mode switch 26 connects an external input power supply line 44 and the load side power supply line 43. Accordingly, a prescribed DC voltage (for example, +12 [V]) output from the simple power supply 25 is supplied to the load side power supply line 43 via the connector 25a, the ACC socket 24, the external input power supply line 44, and the mode switch 26.

For this reason, the BAT power supply input terminals of the power supply control ECU 31, the key authentication ECU 32 and the power train ECU 33 and the BAT line connection terminal 22c of the DC/DC converter 22 are supplied with necessary power from the load side power supply line 43.

Since the load side power supply line 43 has a high potential, the electric coil of the path switching relay 13 becomes energized, and the switch in the path switching relay 13 is switched. The load side power supply line 43 and the IG output power supply line 45 are connected by the switch. Accordingly, power of a sufficiently high voltage is supplied from the IG output power supply line 45 to the IG line connection terminal 22*d* of the DC/DC converter 22.

Since the backflow prevention element 14 is provided in the configurations shown in FIG. 1, no current flows from the load side power supply line 43 toward the battery power supply line 41. Accordingly, even when the voltage of the battery power supply line 41 decreases abnormally, no excessive current flows from the load side power supply line 43 to the battery power supply line 41, and a load of the simple power supply 25 can be prevented from becoming excessive.

In this state, necessary power is supplied to the BAT line connection terminal 22*c* and the IG line connection terminal 22*d* of the DC/DC converter 22. Accordingly, when the power train ECU 33 controls the signal of the control line 48, the internal circuit of the DC/DC converter 22 can be activated.

When the DC/DC converter 22 is activated, the high voltage power supplied from the high voltage battery 21 is stepped down by the internal circuit of the DC/DC converter 22, and appears on the low voltage side output terminal 22*b* as low voltage power.

The low voltage power output to the low voltage side output terminal 22*b* of the DC/DC converter 22 is supplied to the battery power supply line 41. Accordingly, the power stored in the high voltage battery 21 can be used to charge the low voltage battery 23. When the voltage of the battery power supply line 41 is higher than that of the load side power supply line 43, a current flows from the battery power supply line 41 to the load side power supply line 43 via the backflow prevention element 14.

That is, after the internal circuit of the DC/DC converter 22 is activated, the power supply voltage appearing on the load side power supply line 43 can be maintained sufficiently high even when the simple power supply 25 is consumed and an output voltage thereof decreases or when the user removes the simple power supply 25. Accordingly, operation of the DC/DC converter 22, normal operation of the power supply control ECU 31, the key authentication ECU 32 and the power train ECU 33, and the starting operation of the engine or the like of the vehicle can be continued. For this reason, even when the simple power supply 25 has a small size and a fairly small amount of power that can be supplied, the simple power supply 25 can be sufficiently used as a power supply for emergency to start the vehicle.

In a normal state, the simple power supply 25 is removed, and instead, various external devices prepared by the user can be used as loads and connected to the ACC socket 24. When the user switches the mode switch 26 to the normal mode, the power output from the low voltage battery 23 is supplied to the load side via the battery power supply line 41, the ACC relay 11, the ACC power supply line 42, the mode switch 26, and the ACC socket 24. When the power supply control ECU 31 controls the ACC relay 11 to be turned off, supply of power to the load connected to the ACC socket 24 is cut off.

Modification-1

<Configuration of System>

Figure 2:
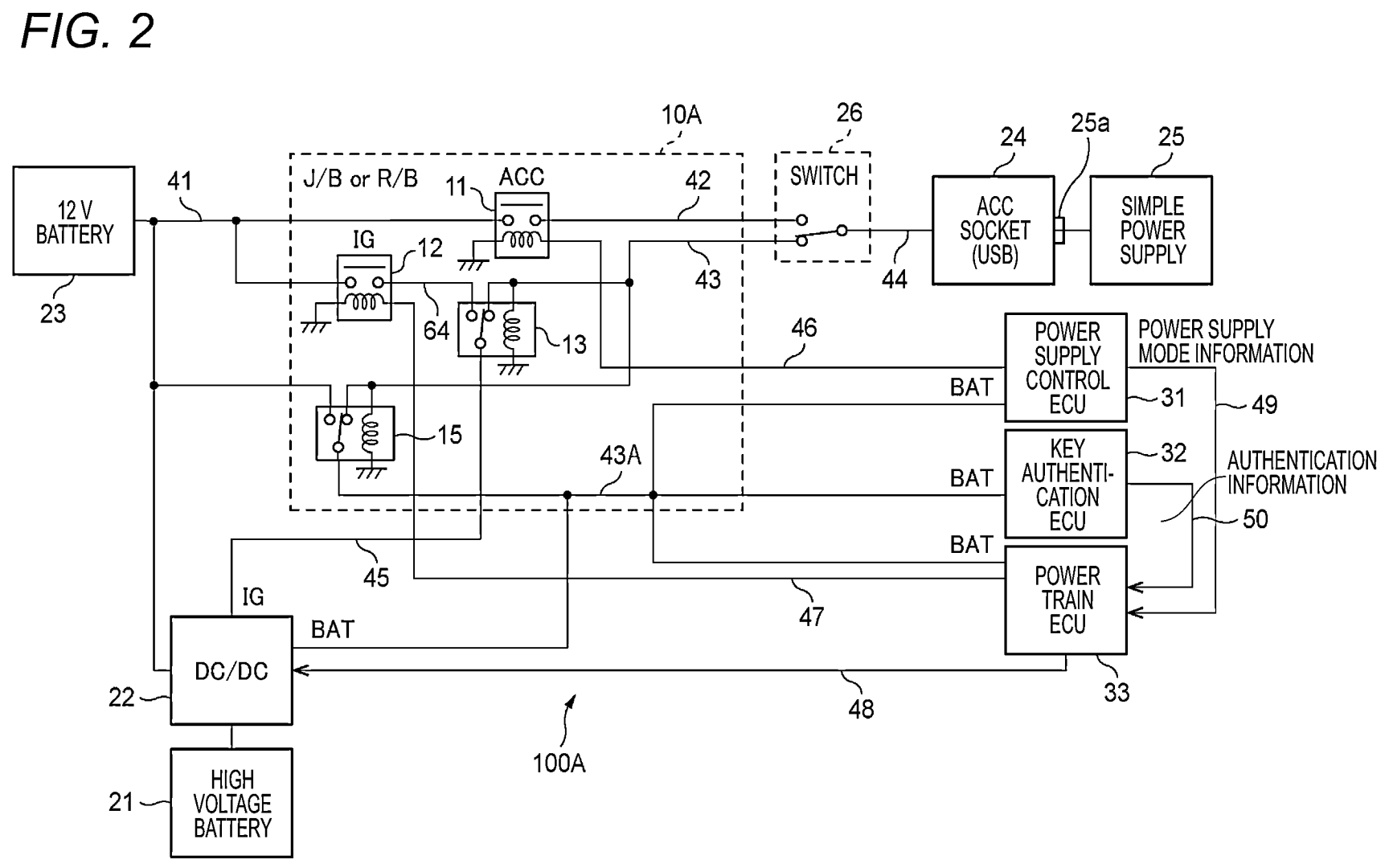

FIG. 2 is an electric circuit diagram showing a power control system 100A according to Modification-1. The power control system 100A of FIG. 2 is a modification of the power control system 100 shown in FIG. 1, and internal configurations of an electric junction box 10A are changed. The configurations of the electric junction box 10A in FIG. 2 will be described below.

The electric junction box 10A includes a path switching relay 15 instead of the backflow prevention element 14. The path switching relay 15 includes a switch including an electric coil for contact driving and two electric contacts that can be selectively connected. One terminal of the electric coil of the path switching relay 15 is connected to the load side power supply line 43, and the other terminal thereof is connected to the ground.

The switch of the path switching relay 15 can selectively connect a terminal connected to a load side power supply line 43A to a contact of one of the battery power supply line 41 and the load side power supply line 43. Since the electric coil of the path switching relay 15 is connected to the load side power supply line 43, a selection state of the switch of the path switching relay 15 is automatically switched according to whether a voltage is applied to the load side power supply line 43.

The BAT line connection terminal 22*c* of the DC/DC converter 22 and BAT power supply input terminals of the power supply control ECU 31, the key authentication ECU 32 and the power train ECU 33 are connected to the load side power supply line 43A.

When a prescribed voltage is applied to the load side power supply line 43, the switch of the path switching relay 15 connects the load side power supply line 43 and the load side power supply line 43A. When a prescribed voltage is not applied to the load side power supply line 43, the switch of the path switching relay 15 connects the battery power supply line 41 and the load side power supply line 43A.

That is, the path switching relay 15 can automatically switch a path of a supply source of a power supply of a BAT system of the DC/DC converter 22, the power supply control ECU 31, the key authentication ECU 32, and the power train ECU 33.

<Operation of System>

Operation of the power control system 100A shown in FIG. 2 will be described below.

For example, when the low voltage battery 23 is exhausted, the user connects the simple power supply 25 to the ACC socket 24 and switches the mode switch 26 from the normal mode to the emergency start mode (state shown in FIG. 2). Accordingly, the engine or the like can be started as described below.

In this case, as shown in FIG. 2, the mode switch 26 connects the external input power supply line 44 and the load side power supply line 43. Accordingly, a prescribed DC voltage (for example, +12 [V]) output from the simple power supply 25 is supplied to the load side power supply line 43 via the connector 25*a*, the ACC socket 24, the external input power supply line 44, and the mode switch 26.

Accordingly, the electric coil of the path switching relay 13 becomes energized, and the switch of the path switching relay 13 connects the load side power supply line 43 and the IG output power supply line 45. Further, the electric coil of the path switching relay 15 is energized, and the switch of the path switching relay 15 connects the load side power supply line 43 and the load side power supply line 43A.

Accordingly, power of the simple power supply 25 is supplied to the BAT line connection terminal 22*c* and the IG line connection terminal 22*d* of the DC/DC converter 22, and the BAT power supply input terminals of the power supply control ECU 31, the key authentication ECU 32, and the power train ECU 33.

In this state, necessary power is supplied to the BAT line connection terminal 22c and the IG line connection terminal 22d of the DC/DC converter 22. Accordingly, when the power train ECU 33 controls the signal of the control line 48, the internal circuit of the DC/DC converter 22 can be activated.

When the DC/DC converter 22 is activated, the high voltage power supplied from the high voltage battery 21 is stepped down by the internal circuit of the DC/DC converter 22, and appears on the low voltage side output terminal 22b as low voltage power.

The low voltage power output to the low voltage side output terminal 22b of the DC/DC converter 22 is supplied to the battery power supply line 41. Accordingly, the power stored in the high voltage battery 21 can be used to charge the low voltage battery 23.

When the engine or the like of the vehicle successfully starts up and the user removes the simple power supply 25 or switches the mode switch 26 to the normal mode, or when the output voltage of the simple power supply 25 decreases, the load side power supply line 43 has a low potential. Accordingly, energization of the electric coil of the path switching relay 13 and the electric coil of the path switching relay 15 is stopped. Accordingly, the switch of the path switching relay 13 is switched to a state of connecting the IG input power supply line 64 and the IG output power supply line 45, and the switch of the path switching relay 15 is switched to a state of connecting the battery power supply line 41 and the load side power supply line 43A.

Accordingly, supply of power to the IG line connection terminal 22d of the DC/DC converter 22 can be continued through a path passing through the battery power supply line 41, the IG relay 12, the path switching relay 13, and the IG output power supply line 45. Further, supply of power to the BAT line connection terminal 22c of the DC/DC converter 22 and the BAT power supply input terminals of the power supply control ECU 31, the key authentication ECU 32, and the power train ECU 33 can be continued through a path passing through the battery power supply line 41, the path switching relay 15, and the load side power supply line 43A.

That is, if sufficient power can be supplied from a simple power supply 25 side just until the internal circuit of the DC/DC converter 22 is activated when the engine or the like of the vehicle cannot start up due to the exhausted low voltage battery 23, power stored on the high voltage battery 21 side can be used thereafter, and thus the engine or the like can easily start up. For this reason, even when the simple power supply 25 has a small size and a fairly small amount of power that can be supplied, the simple power supply 25 can be sufficiently used as a power supply for emergency to start the vehicle.

Modification-2

<Configuration of System>

Figure 3:
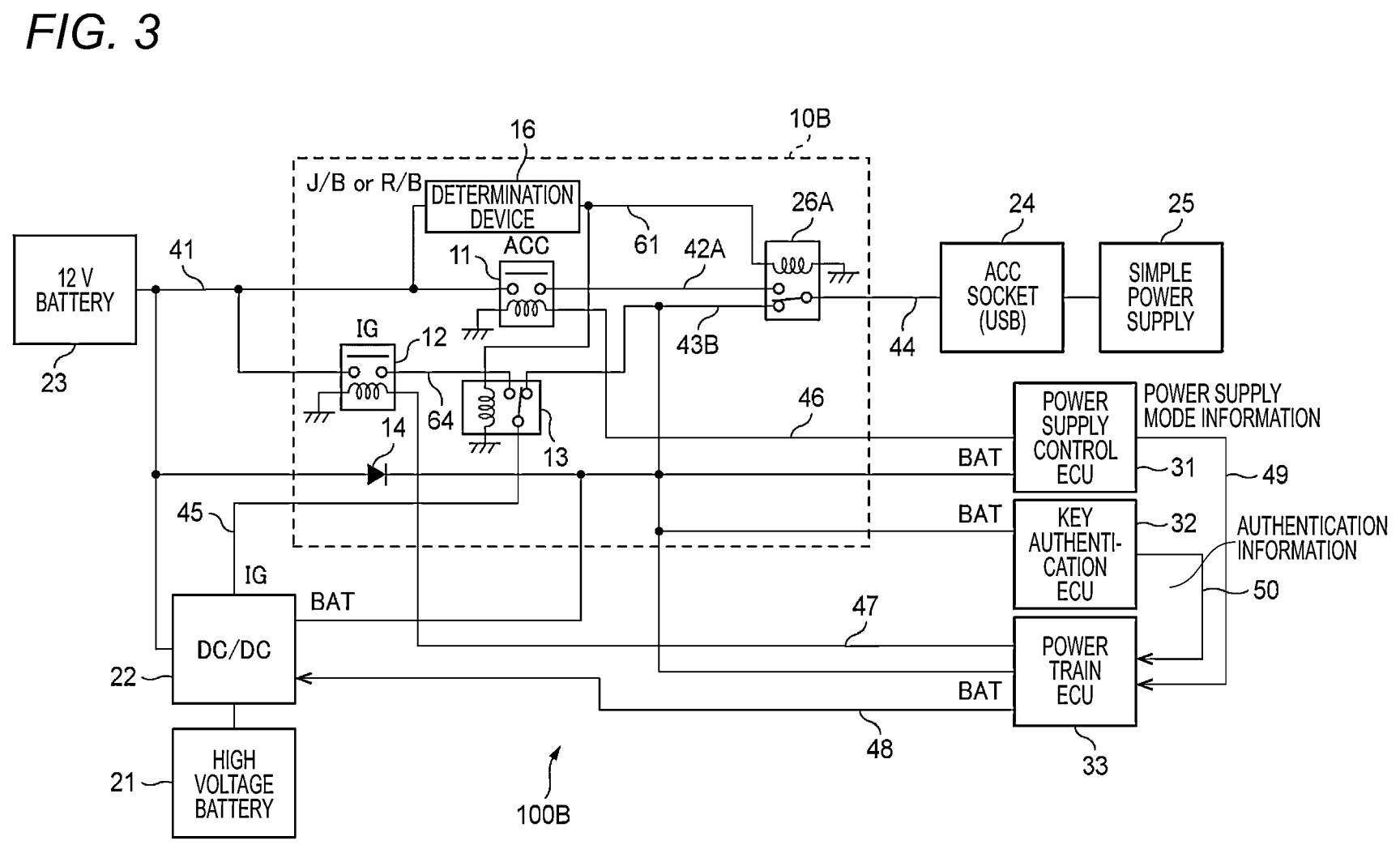

FIG. 3 is an electric circuit diagram showing a power control system 100B according to Modification-2. The power control system 100B of FIG. 3 is a modification of the power control system 100 shown in FIG. 1.

In the power control system 100B of FIG. 3, a mode switching relay 26A instead of the mode switch 26 shown in FIG. 1 is provided in an electric junction box 10B, and a determination device 16 is further added to the electric junction box 10B.

As shown in FIG. 3, the determination device 16 has an input terminal connected to the battery power supply line 41 and an output terminal connected to one end of the electric coil of the path switching relay 13 and one end of an electric coil of the mode switching relay 26A via a mode control line 61.

The determination device 16 monitors a voltage of the battery power supply line 41 and outputs a signal indicating presence or absence of battery exhaustion. This signal is applied to the electric coil of the path switching relay 13 and the electric coil of the mode switching relay 26A to switch states of switches of the path switching relay 13 and the mode switching relay 26A.

The mode switching relay 26A includes a switch including an electric coil for contact driving and two electric contacts that can be selectively connected. One terminal of the electric coil of the mode switching relay 26A is connected to the mode control line 61, and the other terminal thereof is connected to the ground.

The switch of the mode switching relay 26A selectively connects a terminal connected to the external input power supply line 44 to a contact of one of an ACC power supply line 42A and a load side power supply line 43B, and selects one of the emergency start mode or the normal mode described above. A state shown in FIG. 3 is a selection state of the emergency start mode.

Configurations of the power control system 100B other than the above are the same as those of the power control system 100 of FIG. 1.

<Operation of System>

Operation of the power control system 100B shown in FIG. 3 will be described below.

When the user connects the prescribed simple power supply 25 to the ACC socket 24, a DC voltage (for example, +12 [V]) supplied from the simple power supply 25 is supplied to an internal circuit of the electric junction box 10B via the ACC socket 24.

When the low voltage battery 23 is exhausted, the determination device 16 in the electric junction box 10B detects a voltage decrease of the battery power supply line 41 and automatically controls a selection state of the mode switching relay 26A and the path switching relay 13 based on the signal output to the mode control line 61. Accordingly, as shown in FIG. 3, the switch of the mode switching relay 26A connects the external input power supply line 44 and the load side power supply line 43B, and the path switching relay 13 connects the load side power supply line 43B and the IG output power supply line 45. This is the emergency start mode.

Accordingly, the prescribed DC voltage output from the simple power supply 25 is supplied to the load side power supply line 43B via the ACC socket 24, the external input power supply line 44, and the mode switching relay 26A.

For this reason, the BAT power supply input terminals of the power supply control ECU 31, the key authentication ECU 32 and the power train ECU 33 and the BAT line connection terminal 22c of the DC/DC converter 22 are supplied with necessary power from the load side power supply line 43B. Further, necessary power is supplied from the load side power supply line 43B to the IG line connection terminal 22d of the DC/DC converter 22 via the path switching relay 13 and the IG output power supply line 45.

Since the backflow prevention element 14 is provided in the configurations shown in FIG. 3, no current flows from the load side power supply line 43B toward the battery power supply line 41. Accordingly, even when the voltage of the battery power supply line 41 decreases abnormally, no excessive current flows from the load side power supply line 43B to the battery power supply line 41, and a load of the simple power supply 25 can be prevented from becoming excessive.

In this state, necessary power is supplied to the BAT line connection terminal 22c and the IG line connection terminal 22d of the DC/DC converter 22. Accordingly, when the power train ECU 33 controls the signal of the control line 48, the internal circuit of the DC/DC converter 22 can be activated.

When the DC/DC converter 22 is activated, the high voltage power supplied from the high voltage battery 21 is stepped down by the internal circuit of the DC/DC converter 22, and appears on the low voltage side output terminal 22b as low voltage power.

The low voltage power output to the low voltage side output terminal 22b of the DC/DC converter 22 is supplied to the battery power supply line 41. Accordingly, the power stored in the high voltage battery 21 can be used to charge the low voltage battery 23. When the voltage of the battery power supply line 41 is higher than the load side power supply line 43B, a current flows from the battery power supply line 41 to the load side power supply line 43B via the backflow prevention element 14.

That is, after the internal circuit of the DC/DC converter 22 is activated, the power supply voltage appearing on the load side power supply line 43B can be maintained sufficiently high even when the simple power supply 25 is consumed and an output voltage thereof decreases or when the user removes the simple power supply 25. Accordingly, operation of the DC/DC converter 22, normal operation of the power supply control ECU 31, the key authentication ECU 32 and the power train ECU 33, and the starting operation of the engine or the like of the vehicle can be continued. For this reason, even when the simple power supply 25 has a small size and a fairly small amount of power that can be supplied, the simple power supply 25 can be sufficiently used as a power supply for emergency to start the vehicle.

When the exhausted state of the low voltage battery 23 is eliminated and the battery power supply line 41 has a sufficiently high voltage, the determination device 16 detects this change and switches a signal to be output to the mode control line 61. Accordingly, the switch of the mode switching relay 26A is switched to a state of connecting the external input power supply line 44 and the ACC power supply line 42A, and the path switching relay 13 is switched to a state of connecting the IG input power supply line 64 and the IG output power supply line 45.

Modification-3

<Configuration of System>

Figure 4:
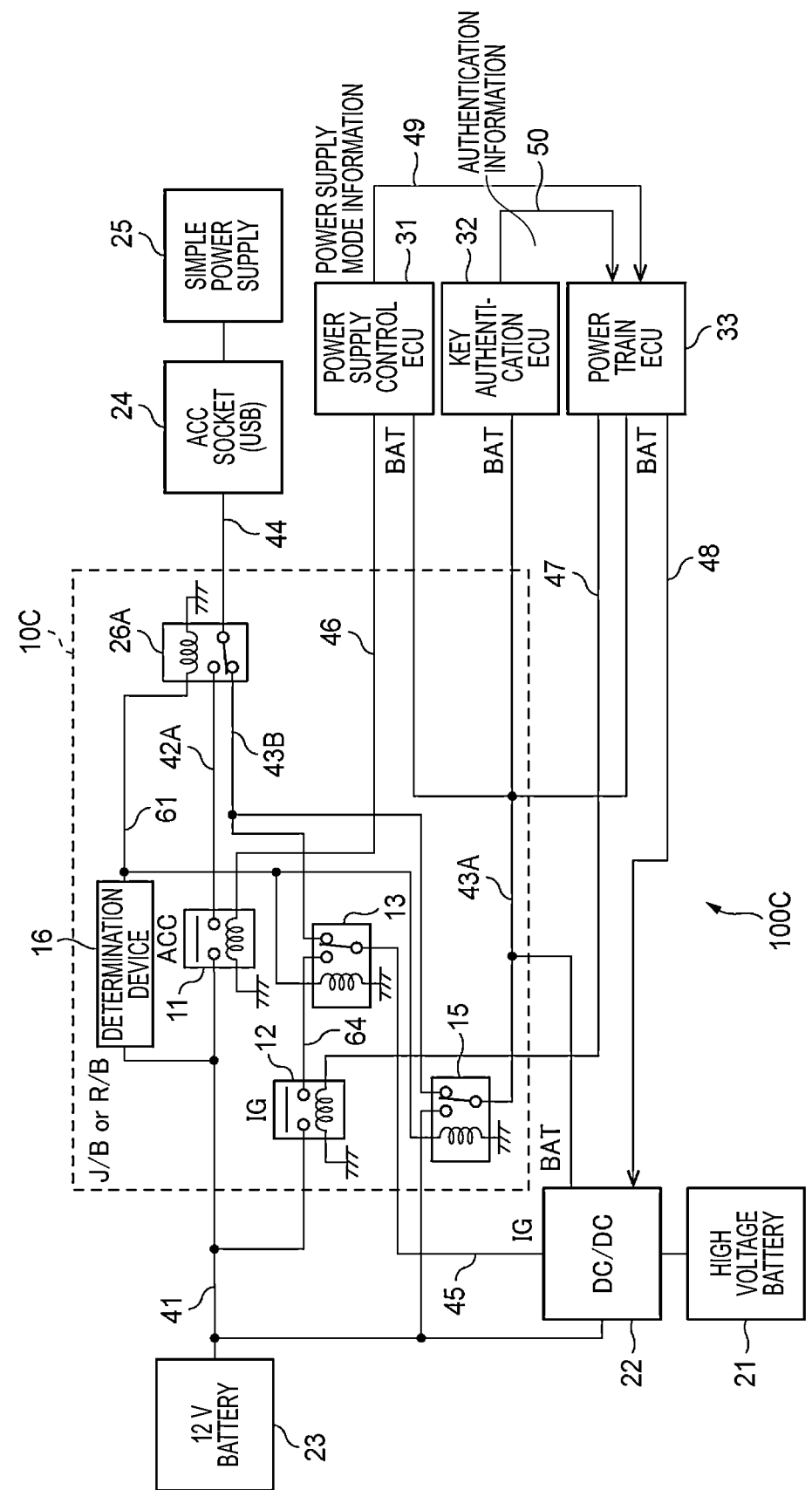
FIG. 4 is an electric circuit diagram showing a power control system according to Modification-3.

FIG. 4 is an electric circuit diagram showing a power control system 100C according to Modification-3. The power control system 100C of FIG. 4 is a modification of the power control system 100B shown in FIG. 3, and internal configurations of an electric junction box 10C are changed. The configurations of the electric junction box 10C in FIG. 4 will be described below.

The electric junction box 10C includes the path switching relay 15 instead of the backflow prevention element 14. The path switching relay 15 includes a switch including an electric coil for contact driving and two electric contacts that can be selectively connected. One terminal of the electric coil of the path switching relay 15 is connected to the mode control line 61, and the other terminal thereof is connected to the ground.

The switch of the path switching relay 15 can selectively connect a terminal connected to the load side power supply line 43A to a contact of one of the battery power supply line 41 and the load side power supply line 43B. Since the electric coil of the path switching relay 15 is connected to the mode control line 61, a selection state of the switch of the path switching relay 15 is automatically switched according to a determination state of the determination device 16.

The BAT line connection terminal 22c of the DC/DC converter 22 and BAT power supply input terminals of the power supply control ECU 31, the key authentication ECU 32 and the power train ECU 33 are connected to the load side power supply line 43A.

When the low voltage battery 23 is exhausted, the determination device 16 detects a voltage decrease of the battery power supply line 41, and thus the switch of the path switching relay 15 connects the load side power supply line 43B and the load side power supply line 43A. When the low voltage battery 23 is not exhausted, the switch of the path switching relay 15 connects the battery power supply line 41 and the load side power supply line 43A.

That is, the path switching relay 15 can automatically switch a path of a supply source of a power supply of a BAT system of the DC/DC converter 22, the power supply control ECU 31, the key authentication ECU 32, and the power train ECU 33.

Configurations of the electric junction box 10C other than the above are the same as those of the electric junction box 10B of FIG. 3.

<Operation of System>

Operation of the power control system 100C shown in FIG. 4 will be described below.

When the user connects the prescribed simple power supply 25 to the ACC socket 24, a DC voltage (for example, +12 [V]) supplied from the simple power supply 25 is supplied to an internal circuit of the electric junction box 10C via the ACC socket 24.

When the low voltage battery 23 is exhausted, the determination device 16 in the electric junction box 10B detects a voltage decrease of the battery power supply line 41 and automatically controls a selection state of the mode switching relay 26A and the path switching relay 13 based on the signal output to the mode control line 61. Accordingly, as shown in FIG. 4, the switch of the mode switching relay 26A connects the external input power supply line 44 and the load side power supply line 43B, and the path switching relay 13 connects the load side power supply line 43B and the IG output power supply line 45. As shown in FIG. 4, the switch of the path switching relay 15 connects the load side power supply line 43B and the load side power supply line 43A.

Accordingly, power of the simple power supply 25 is supplied to the BAT line connection terminal 22c and the IG line connection terminal 22d of the DC/DC converter 22, and the BAT power supply input terminals of the power supply control ECU 31, the key authentication ECU 32, and the power train ECU 33.

In this state, necessary power is supplied to the BAT line connection terminal 22c and the IG line connection terminal 22d of the DC/DC converter 22. Accordingly, when the power train ECU 33 controls the signal of the control line 48, the internal circuit of the DC/DC converter 22 can be activated.

When the DC/DC converter 22 is activated, the high voltage power supplied from the high voltage battery 21 is stepped down by the internal circuit of the DC/DC converter 22, and appears on the low voltage side output terminal 22*b* as low voltage power.

The low voltage power output to the low voltage side output terminal 22*b* of the DC/DC converter 22 is supplied to the battery power supply line 41. Accordingly, the power stored in the high voltage battery 21 can be used to charge the low voltage battery 23.

When the exhausted state of the low voltage battery 23 is eliminated and the voltage of the battery power supply line 41 recovers, the determination device 16 detects this voltage increase. Then, the determination device 16 switches the signal to be output to the mode control line 61, so that the selection state of the switches of the mode switching relay 26A and the path switching relay 15 is switched. That is, the switch of the path switching relay 15 connects the battery power supply line 41 and the load side power supply line 43A.

Accordingly, the power on the battery power supply line 41 side is supplied to the BAT power supply input terminals of the DC/DC converter 22, the power supply control ECU 31, the key authentication ECU 32, and the power train ECU 33 via the switch of the path switching relay 15 and the load side power supply line 43A.

<Configuration of Simple Power Supply 25>

Figure 5:
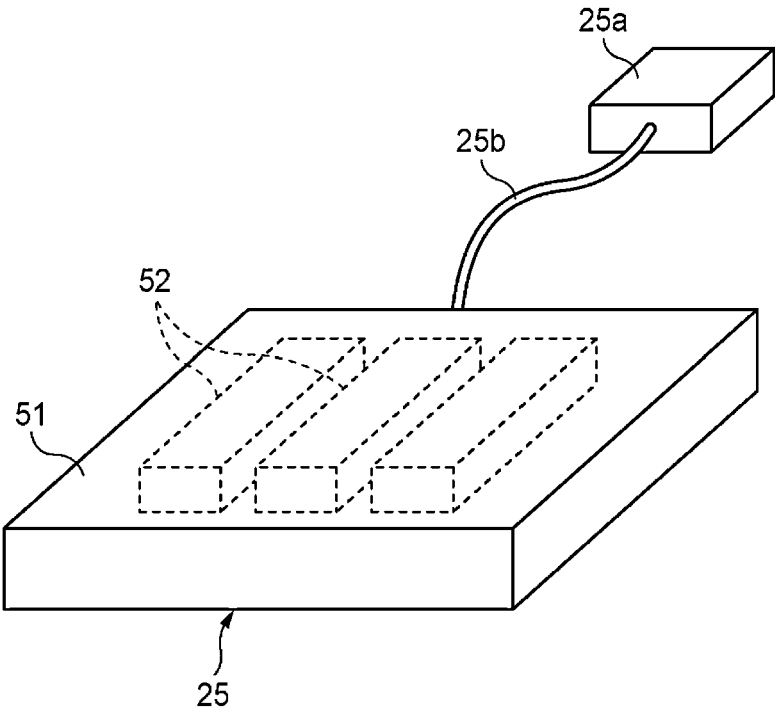
FIG. 5 is a perspective view showing Configuration Example-1 of a simple power supply.
Figure 6:
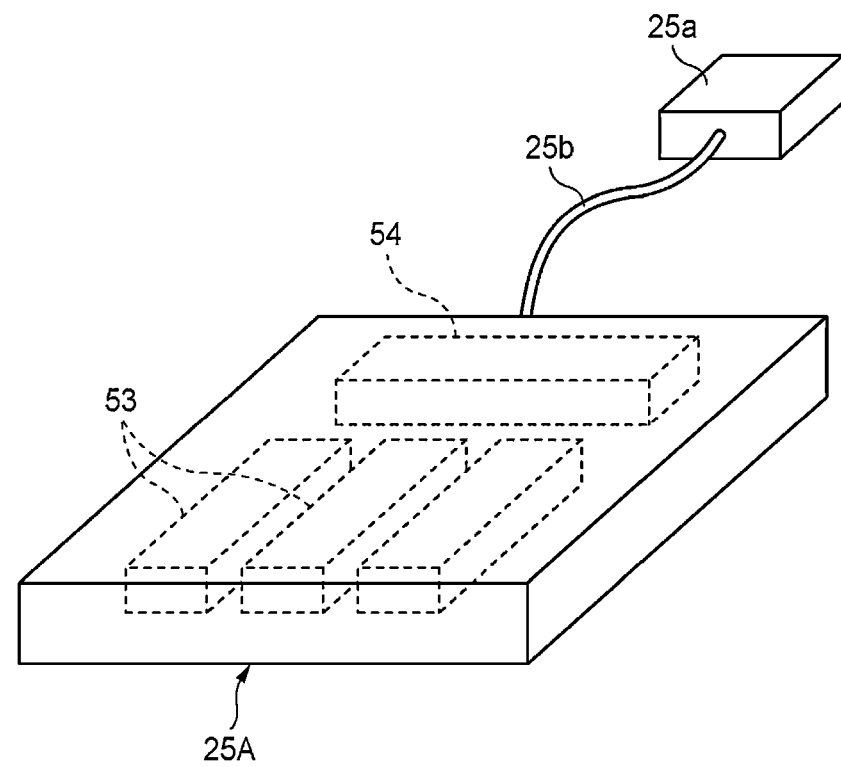
FIG. 6 is a perspective view showing Configuration Example-2 of a simple power supply.
Figure 7:
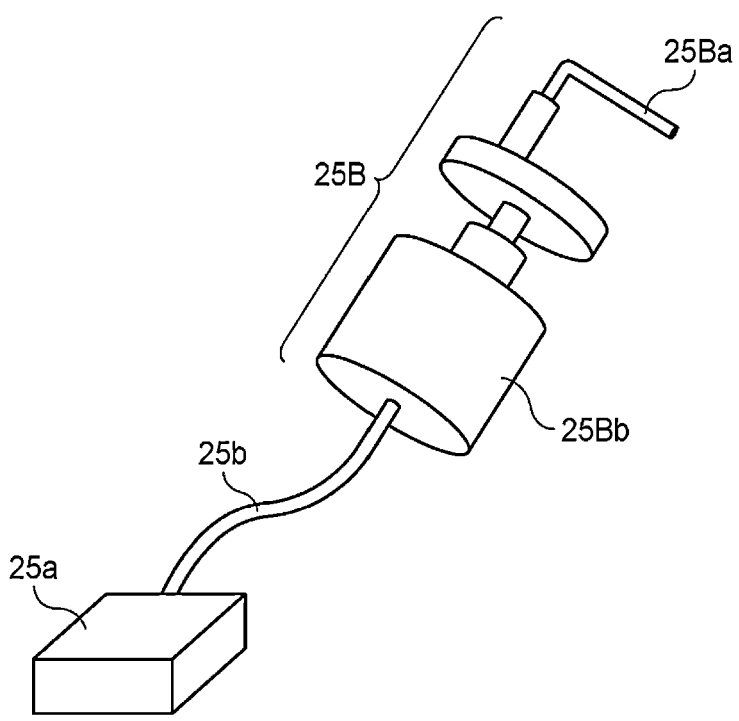
FIG. 7 is a perspective view showing Configuration Example-3 of a simple power supply.

FIGS. 5 to 7 show three types of configuration examples of a specific simple power supply usable in the power control system shown in FIGS. 1 to 4.

Configuration Example-1

The simple power supply 25 shown in FIG. 5 constitutes a battery pack, and includes a plurality of dry batteries 52 housed in an internal space of a battery case 51. The battery case 51 is formed in a box shape having a small height, and has the internal space that can house the plurality of dry batteries 52.

The plurality of dry batteries 52 in the battery case 51 are connected in series to form a power supply circuit that can output a DC voltage of, for example, +12 [V]. The output of the power supply circuit is drawn to outside of the battery case 51 by a power supply cord 25*b*. The connector 25*a* is coupled to a distal end of the power supply cord 25*b*. The connector 25*a* has a shape compatible with, for example, a USB standard to be attached to the ACC socket 24 on the vehicle side.

Configuration Example-2

A simple power supply 25A shown in FIG. 6 constitutes an integrated battery module, and includes a plurality of dry batteries 53 housed in the battery case 51 or an inner space of an exterior, and a booster circuit 54. The battery case 51 is formed in a box shape having a small height, and has an internal space that can house the plurality of dry batteries 53 and the booster circuit 54.

The booster circuit 54 is connected to an output of a power supply circuit constituted by the plurality of dry batteries 53. The booster circuit 54 can boost an output voltage of the power supply circuit and generate a power supply voltage necessary for the vehicle side, for example, a DC voltage of +12 [V].

An output of the booster circuit 54 is drawn to outside of the battery case 51 by the power supply cord 25*b*. The connector 25*a* is coupled to the distal end of the power supply cord 25*b*. The connector 25*a* has a shape compatible with, for example, a USB standard to be attached to the ACC socket 24 on the vehicle side.

Configuration Example-3

A simple power supply 25B shown in FIG. 7 includes a rotary steering wheel 25Ba and a generator 25Bb. The rotary steering wheel 25Ba has an output shaft coupled to a rotation shaft of the generator 25Bb. Accordingly, when the user manually operates the rotary steering wheel 25Ba to rotate the shaft, the rotation shaft of the generator 25Bb coupled thereto is driven. Then, the generator 25Bb generates power, and a DC voltage appears at an output terminal thereof.

The output terminal of the generator 25Bb is connected to the power supply cord 25*b*. The connector 25*a* is coupled to the distal end of the power supply cord 25*b*. The connector 25*a* has a shape compatible with, for example, a USB standard to be attached to the ACC socket 24 on the vehicle side.

The output shaft of the rotary steering wheel 25Ba and the rotation shaft of the generator 25Bb may be directly coupled. In a more preferred embodiment, a coupling mechanism including a flat spiral spring is assumed between the output shaft of the rotary steering wheel 25Ba and the rotation shaft of the generator 25Bb. When the flat spiral spring is used, the user can naturally rotate the rotation shaft of the generator 25Bb by a restoring force of the flat spiral spring after winding the flat spiral spring by manual operation. Accordingly, an output voltage of the generator 25Bb is stabilized.

As described above, in the vehicle equipped with the power control system 100 according to the present embodiment, the user connects the simple power supply 25 to the ACC socket 24 when the low voltage battery 23 is exhausted, so that power necessary for starting the engine or the like can be ensured. Further, power accumulated on the high voltage battery 21 side can be used after the internal circuit of the DC/DC converter 22 is activated, and thus the small-sized simple power supply 25 having a small power capacity can be used. Accordingly, troublesome and time-consuming operation such as jump start is not necessary.

The present disclosure is not limited to the embodiment described above and can be appropriately modified, improved and the like. In addition, materials, shapes, sizes, numbers, arrangement positions and the like of components in the embodiment described above are freely selected and are not limited as long as the present disclosure can be implemented.

Here, features of the power control system according to the above-described embodiment of the present disclosure are briefly summarized and listed in following first to fifth aspects.

According to the first aspect, a vehicular power control system (power control system 100) includes:

a high voltage battery (21) mounted on a vehicle;

a voltage conversion unit (DC/DC converter 22) configured to convert a high voltage output from the high voltage battery into a low voltage;

a control unit (power train ECU 33) configured to control activation of the voltage conversion unit;

a low voltage battery (23) configured to supply a prescribed operation voltage to the voltage conversion unit and the control unit; and an external power supply connector (ACC socket 24) configured to connect a prescribed external power supply (simple power supply 25), in which the control unit has a function (mode switch 26, or mode switching relay 26A, and path switching relay 13) of at least temporarily supplying external power to the voltage conversion unit and the control unit as the operation voltage instead of the low voltage battery, the external power being supplied from the external power supply via the external power supply connector.

According to the vehicular power control system having the configuration of the first aspect, when the low voltage battery is exhausted, an internal circuit of the voltage conversion unit can be activated using the power of the prescribed external power supply prepared by the user in a state in which the external power supply is connected to the external power supply connector. After the voltage conversion unit is activated, high voltage power stored on a high voltage battery side can be stepped down by the voltage conversion unit and supplied to a power supply path on a low voltage battery side. Accordingly, even when the external power supply has a small power capacity, an engine or the like can start up, and troublesome and time-consuming operation such as jump start is not necessary.

According to the second aspect, in the vehicular power control system according to the first aspect, the control unit includes a switching circuit (mode switch 26, or mode switching relay 26A) that selectively switches a connection destination of a circuit of the external power supply connector to one of a first circuit (ACC power supply line 42) connected to the low voltage battery and a second circuit (load side power supply line 43) connected to the voltage conversion unit and the control unit.

According to the vehicular power control system having the configuration of the second aspect, an emergency start mode and a normal mode can be selectively used by switching the connection destination of the circuit of the external power supply connector. Accordingly, an ACC connector of an accessory device mounted on a general vehicle can be used as a connection destination of an external power supply.

According to the third aspect, in the vehicular power control system according to the first aspect, the control unit includes:
   a switching circuit (mode switching relay 26A) that selectively switches a connection destination of a circuit of the external power supply connector to one of a first circuit connected to the low voltage battery and a second circuit connected to the voltage conversion unit and the control unit; and
   a voltage detection circuit (determination device 16) that controls the switching circuit when an output voltage of the low voltage battery decreases and automatically connects the circuit of the external power supply connector to the voltage conversion unit and the control unit.

According to the vehicular power control system having the configuration of the third aspect, even if a user does not perform special switch operation when the low voltage battery is exhausted, the internal circuit of the voltage conversion unit can be activated using the power supplied from the external power supply, and thus the engine or the like can start up.

According to the fourth aspect, in the vehicular power control system according to the first aspect, the control unit includes:
   a switching circuit (mode switch 26 or mode switching relay 26A) that selectively switches a connection destination of a circuit of the external power supply connector to one of a first circuit (ACC power supply line 42) connected to the low voltage battery and a second circuit (load side power supply line 43) connected to the voltage conversion unit and the control unit; and
   a backflow prevention circuit (backflow prevention element 14) connected between an output of the low voltage battery and the second circuit.

According to the vehicular power control system having the configuration of the fourth aspect, an emergency start mode and a normal mode can be selectively used by switching the connection destination of the circuit of the external power supply connector. In addition, by preventing an excessive current from flowing from an external power supply side to the low voltage battery side by the backflow prevention circuit, an excessive load on the external power supply can be avoided, and the voltage conversion unit can be easily activated. When a voltage on the low voltage battery side increases after the voltage conversion unit is activated, a current passing through the backflow prevention circuit from the low voltage battery side can be supplied to a load such as the voltage conversion unit, and thus power consumption of the external power supply can be restricted to a minimum limit.

According to the fifth aspect, in the vehicular power control system according to the first aspect, the control unit includes:
   a switching circuit (mode switch 26 or mode switching relay 26A) that selectively switches a connection destination of a circuit of the external power supply connector to one of a first circuit (ACC power supply line 42) connected to the low voltage battery and a second circuit (load side power supply line 43) connected to the voltage conversion unit and the control unit; and
   a relay circuit (path switching relay 15) that switches an output of the low voltage battery and a connection state between the second circuit and a load side circuit.

According to the vehicular power control system having the configuration of the fifth aspect, an emergency start mode and a normal mode can be selectively used by switching the connection destination of the circuit of the external power supply connector. Further, a path for supplying power to a load can be appropriately switched using the relay circuit. That is, when necessary power is supplied from the external power supply side to a load side until the voltage conversion unit is activated and the voltage conversion unit is activated and the voltage on the low voltage battery side increases, necessary power can be supplied from the low voltage battery side to the load side, and thus power consumption of the external power supply can be restricted to a minimum limit.

The present application is based on a Japanese patent application (No. 2022-154023) filed on Sep. 27, 2022, contents of which are incorporated herein by reference.

What is claimed is:

1. A vehicular power control system comprising:
   a high voltage battery mounted on a vehicle;
   a voltage conversion unit configured to convert a high voltage output from the high voltage battery into a low voltage;
   a control unit configured to control activation of the voltage conversion unit;
   a low voltage battery configured to supply a prescribed operation voltage to the voltage conversion unit and the control unit; and
   an external power supply connector configured to connect a prescribed external power supply, wherein the control unit has a function of at least temporarily supplying external power to the voltage conversion unit and the control unit as the operation voltage instead of the low voltage battery, the external power being supplied from the external power supply via the external power supply connector, and the control unit includes:

a switching circuit that selectively switches a connection destination of a circuit of the external power supply connector away from a first circuit connected to the low voltage battery and to a second circuit connected to the voltage conversion unit and the control unit, the switching circuit includes:

a first terminal connected to the external power supply connector, a second terminal connected to the low voltage battery, and an output terminal connected to the voltage conversion unit and the control unit, an IG relay circuit configured to switch an opening and closing of a connection of a battery power supply line connected to the low voltage battery and an IG input power supply line such that the control unit controls the opening and closing of the connection, and a path switching relay that selectively switches a connection destination of an IG line connection terminal of the voltage conversion unit to one of the second circuit and the IG input power supply line such that a selection state by the path switching relay is automatically switched according to whether a voltage is applied to the second circuit.

2. The vehicular power control system according to claim 1, wherein the control unit includes: a backflow prevention circuit connected between an output of the low voltage battery and the second circuit.

3. The vehicular power control system according to claim 1, wherein the control unit includes: a relay circuit that switches an output of the low voltage battery and a connection state between the second circuit and a load side circuit.

4. A vehicular power control system comprising:
a high voltage battery mounted on a vehicle;
a voltage conversion unit configured to convert a high voltage output from the high voltage battery into a low voltage;
a control unit configured to control activation of the voltage conversion unit;
a low voltage battery configured to supply a prescribed operation voltage to the voltage conversion unit and the control unit; and
an external power supply connector configured to connect a prescribed external power supply, wherein
the control unit has a function of at least temporarily supplying external power to the voltage conversion unit and the control unit as the operation voltage instead of the low voltage battery, the external power being supplied from the external power supply via the external power supply connector, and
the control unit includes:

a switching circuit that selectively switches a connection destination of a circuit of the external power supply connector away from a first circuit connected to the low voltage battery and to a second circuit connected to the voltage conversion unit and the control unit, an IG relay circuit configured to switch an opening and closing of a connection of a battery power supply line connected to the low voltage battery and an IG input power supply line such that the control unit controls the opening and closing of the connection, and a path switching relay that selectively switches a connection destination of an IG line connection terminal of the voltage conversion unit to one of the second circuit and the IG input power supply line such that a selection state by the path switching relay is automatically switched according to whether a voltage is applied to the second circuit, wherein, the switching circuit has:

a normal mode in which the switching circuit switches the connection destination for the external power supply connector away from the voltage conversion unit and to the low voltage battery; and an emergency start mode in which the switching circuit switches the connection destination for the external power supply connector away from the low voltage battery and to the voltage conversion unit.

* * * * *